May 9, 1967 W. B. JEFFREY 3,318,571
FABRICATED VALVE BUSHING
Filed July 23, 1964
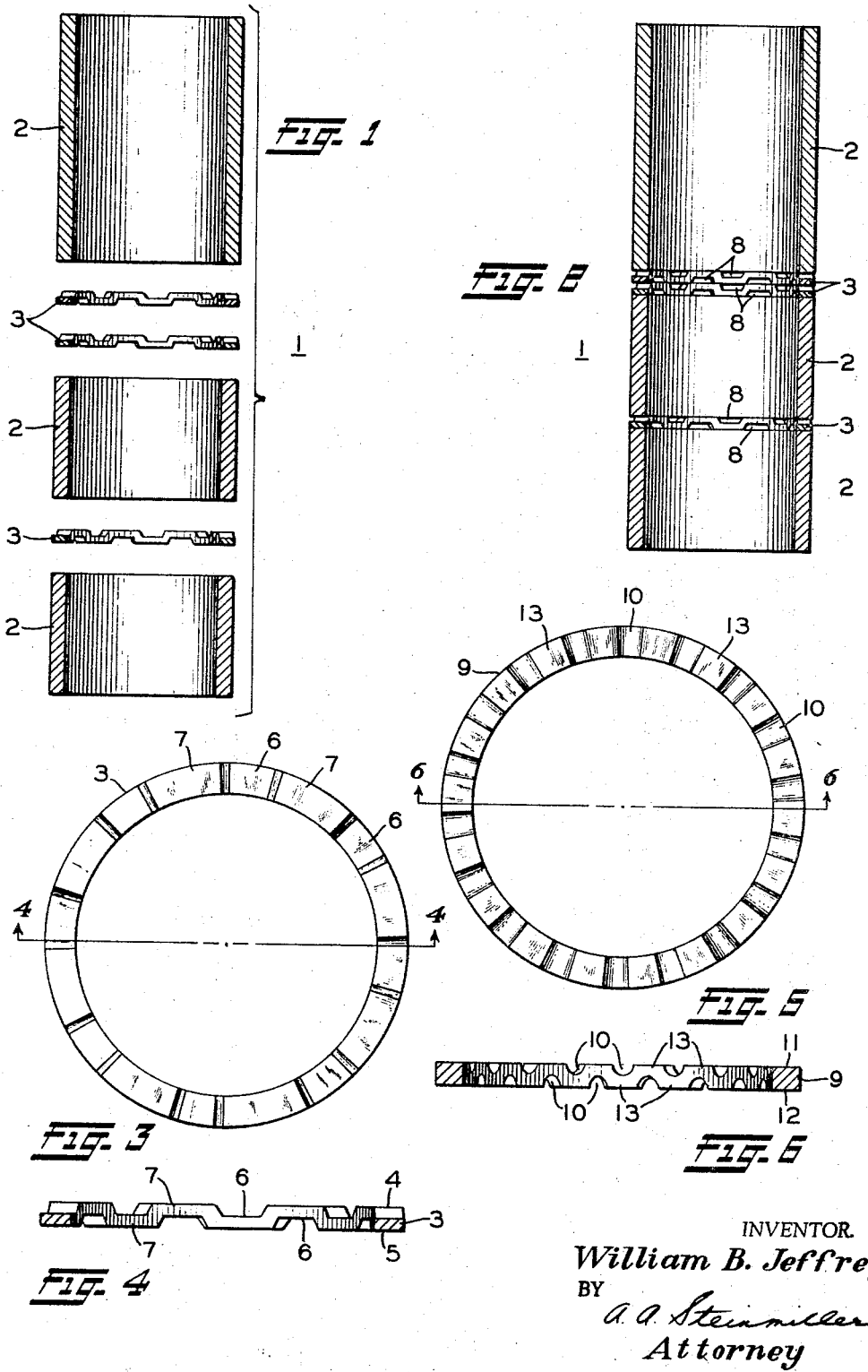
INVENTOR.
William B. Jeffrey
BY
*A. A. Steinmiller*
Attorney

United States Patent Office 3,318,571
Patented May 9, 1967

3,318,571
FABRICATED VALVE BUSHING
William B. Jeffrey, Irwin, Pa., assignor to Westinghouse Air Brake Company, Wilmerding, Pa., a corporation of Pennsylvania
Filed July 23, 1964, Ser. No. 384,594
7 Claims. (Cl. 251—367)

This invention relates generally to fabricated valve bushings, and relates specifically to valve bushings of the type adapted for disposition in a valve body bore between the body and a reciprocably movable valve member having sealing rings on the outer perimeter thereof, the bushing having passages through the wall thereof for effecting communication of passages in the valve body with the bushing bore.

Heretofore, in order to provide passage means of a predetermined minimum size to accommodate a predetermined minimum fluid capacity at each of a plurality of passage means spaced along the axis of the bushing and at the same time provide passage means small enough in diameter to prevent extrusion of the O-rings into the passage openings during movement of the valve member in the bore of the bushing, each of the passage means has comprised a plurality of small diameter ports drilled radially through the bushing to form a circumferentially disposed ring of ports, the number of ports per ring depending upon the desired capacity of each passage means. Occasionally, the large number of ports per passage means required to provide a relatively large flow capacity has necessitated the provision of two immediately adjacent rows or rings of ports on two adjacent planes for one ring passage. The hole or port drilling process is disadvantageous because of the cost and the tendency to weaken the bushing structure. Moreover, the bushing must be further processed to remove fins and burrs after the drilling process is completed.

It is the object of the present invention to provide a ported valve bushing of a fabricated structure to eliminate the previously required costly port drilling operation, and the subsequent operations associated therewith.

In the present invention, this is achieved by fabricating a bushing of a plurality of cylindrical segments having port segments disposed therebetween. The port segments are separately formed annular members having radially disposed grooves on the axially opposed end surfaces thereof so that when one or more port segments are coaxially juxtaposed with the cylindrical segments, the spaces formed between the cylinder ends and the grooves on the port segment cooperate to form radially disposed ports extending through the bushing. The aligned cylindrical segments and port segments are then bonded together to form a fabricated bushing.

These and other objects of the present invention will become more readily apparent when taken in conjunction with the following description and the drawing, in which:

FIG. 1 is an exploded sectional view of a valve bushing showing the individual bushing segments before fabrication;

FIG. 2 is a sectional view of the valve bushing segments of FIG. 1 shown after fabrication to form a ported bushing;

FIG. 3 is an enlarged plan view of one of the port segments of FIG. 1;

FIG. 4 is a sectional view of one of the port segments of FIG. 1 taken substantially along the line 4—4 of FIG. 3;

FIG. 5 is a plan view of a modification of the port section of FIG. 3, and

FIG. 6 is a sectional view of the port section of FIG. 5 taken substantially along the line 6—6 of FIG. 5.

Referring now to the drawing, and particularly to FIGS. 1 and 2 thereof, there is shown a fabricated valve bushing 1 comprising a plurality of coaxially disposed hollow cylindrical members 2, such as may be produced by cutting desired lengths of tubing, and a plurality of ring-like port segments 3 disposed between and in coaxial abutting relationship with adjacent cylindrical segments 2.

Referring now to FIGS. 3 and 4 of the drawing, there is shown one of the port segments 3 being ring-like in structure and having an outside and inside diameter the same as that of the cylinder sections 2. The opposing end surfaces 4 and 5 of the ring member 3 each include a plurality of radially disposed, equally spaced grooves 6 having flat outwardly sloped sides intersecting a flat bottom and forming land areas 7 between adjacent grooves. The grooves on surface 4 are angularly displaced along the ring member perimeter from the grooves on the surface 5 so that the grooves 6 on each surface are disposed immediately opposite the land areas 7 on the other surface to thus provide for minimum axial thickness of the port segment 3 and at the same time provide for maximum uniform thickness of the ring material between the staggered grooves to provide support for the O-ring in its movement over the grooves 6, and also to provide for maximum strength of the port segments per se. The length of the land areas 7 from groove to groove are designedly larger than the maximum width of the grooves 6 from land area to land area so that more than one port segment may be disposed between any two cylindrical members 3, as shown in FIG. 1, to provide for increased porting area at one passage location, and at the same time prevent meshing of the land areas 7 of each port segment 3 with the grooves 6 in the adjacent port member 3, as best illustrated in FIG. 2.

Referring again to FIGS. 1 and 2, it is seen that when a port segment 3, as described above, is disposed between adjacent cylinders, the land areas 7 abut the cylinders 2, and a port 8 is formed by the space between each groove 6 and that portion of the end of the cylinder 2 which is immediately opposite the corresponding groove.

The bushing may be fabricated by applying any suitable commercially available bonding agent to the land areas 7 of each port segment 3, whereupon each port segment or group of port segments, as desired, may be coaxially disposed between adjacent ones of a plurality of coaxially aligned cylinder segments 2 on a suitable aligning mandrel. The segments are then pressed axially together and held in this position until the bonding agent has bonded the segments into a unitary bushing. If machining of the inside and outside diameters of the segments is appropriate, the same may be performed either before or after fabrication, as desired.

Referring now to FIGS. 5 and 6, there is disclosed a port segment 9 having equally spaced, semicircular grooves 10 disposed on the opposing end surfaces 11 and 12 in staggered relationship, in the same manner as are the flat sided grooves in the port segment 3, as shown in FIGS. 3 and 4. The land areas 13 formed between the grooves 10 are wider than the grooves to prevent meshing of the land areas on one segment 9 with the grooves of an adjacent segment 9.

The port segments of FIGS. 3 and 4 and FIGS. 5 and 6 are manufactured independently of the cylinder segments 2 and thus may be inexpensively formed of any suitable material by stamping, sintering or precision casting, all of which methods provide rounded edges and corners on the completed port segments, thus providing the further advantage of eliminating the need for removal of burrs or sharp surfaces as is necessary in the drilled hole type of bushing. In addition, labor costs expanded in forming the port segments are less than those expended in drilling individual holes and in performing subsequent operations relating thereto.

The flat sided groove configuration, shown in FIGS. 3 and 4, is more suitable to the stamping method of manufacture, while the semicircular groove construction, shown in FIGS. 5 and 6, is more suitable to the die-cast manufacturing method. Functionally, the two modifications perform identically.

When the bushing is assembled, each port segment co-operates with the adjacent cylinders to produce a double row of ports which, if selected in size to equal the capacity of a single row of drilled ports, are only half the size of the drilled ports of prior devices, thus providing better support for the O-rings in the movement thereof across the ports, and also better preventing extrusion of the O-rings into the ports when the O-rings move thereover during operation of the valve device.

Having now described the invention, what I claim as new and desire to secure by Letters Patent, is:

1. A fabricated valve bushing comprising:
   (a) a pair of coaxially disposed hollow cylindrical segments having the same inside and outside diameters,
   (b) a port segment disposed between and in coaxial relationship with said cylindrical segments and having the same inside and outside diameters as said cylindrical segments,
   (c) said port segment comprising an annular member having a pair of axially opposing end surfaces, each end surface disposed adjacent the end of a different one of said cylindrical segments, one of said end surfaces having radially disposed groove means therein providing passage means between one of said end surfaces and the end of the adjacent cylindrical segment for intercommunicating the interior and exterior of the bushing, and
   (d) means bonding said cylindrical segments and said port segment into a unitary structure.

2. A fabricated valve bushing, as recited in claim 1, in which said radial groove means in cross section comprises a pair of flat sides intersecting a flat bottom.

3. A fabricated valve bushing, as recited in claim 2, in which the maximum depth of each radial groove is substantially half the axial thickness of the port segment.

4. A fabricated valve bushing, as recited in claim 1, in which said radial groove means comprises a plurality of equally spaced, radially disposed grooves.

5. A fabricated valve bushing, as recited in claim 1, in which said radial groove means comprises in cross section a semicircle.

6. A fabricated valve bushing comprising:
   (a) a pair of coaxially disposed hollow cylindrical segments having the same inside and outside diameters,
   (b) a port segment disposed between and in coaxial relationship with said cylindrical segments and having the same inside and outside diameters as said cylindrical segments,
   (c) said port segment comprising an annular member having a pair of axially opposing end surfaces, each end surface disposed adjacent the end of a different one of said cylindrical segments, each of said end surfaces having radial groove means therein providing passage means between each of said surfaces and the end of the adjacent cylindrical segment for intercommunicating the interior and exterior of of the bushing, and
   (d) means bonding said cylindrical segments and said port segment into a unitary structure.

7. A fabricated valve bushing comprising:
   (a) a pair of coaxially aligned hollow cylindrical segments having the same inside and outside diameters,
   (b) a pair of coaxially aligned port segments disposed side by side between and in coaxial relationship with said cylindrical segments and having inside and outside diameters the same as said cylindrical segments,
   (c) each of said segments comprising an annular member having a pair of axially opposing end surfaces thereon with one end surface of each port segment disposed adjacent one end surface of the other port segment and with the other end surface of each port segment disposed adjacent an end of a different one of said cylindrical members, each of said end surfaces having radial groove means therein providing passage means between the cylindrical segments and port segment for intercommunicating the interior and exterior of the bushing, the spacing between the grooves along each end surface of each port segment being greater than the width of the grooves at the end surface of the port segment, and
   (d) means bonding said hollow cylindrical segments and said port segments into a unitary article.

References Cited by the Examiner

UNITED STATES PATENTS

| | | | |
|---|---|---|---|
| 789,026 | 5/1905 | Huston | 251—324 X |
| 977,427 | 12/1910 | Armstrong | 138—42 |
| 1,555,934 | 10/1925 | Barker | 251—367 X |
| 2,132,030 | 10/1938 | Hunt et al. | 137—625.38 |
| 2,721,573 | 10/1955 | Doll et al. | 251—363 X |
| 2,784,741 | 3/1957 | Parish | 138—42 |
| 2,920,650 | 1/1960 | Moog | 137—625.48 X |
| 2,998,022 | 8/1961 | Russell | 251—367 X |
| 3,199,540 | 8/1965 | Forster | 251—324 X |
| 3,228,655 | 1/1966 | Weise | 251—362 |

M. CARY NELSON, *Primary Examiner.*

S. SCOTT, *Assistant Examiner.*